E. E. WICKERSHAM.
TRACK LINK.
APPLICATION FILED AUG. 13, 1918.

1,336,876.

Patented Apr. 13, 1920.

INVENTOR.
Elmer E. Wickersham
BY
Strong & Townsend
ATTORNEYS.

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACK-LINK.

1,336,876.  Specification of Letters Patent.  Patented Apr. 13, 1920.

Application filed August 13, 1918. Serial No. 249,613.

*To all whom it may concern:*

Be it known that I, ELMER E. WICKERSHAM, a citizen of the United States, residing at Stockton, in the county of Alameda and State of California, have invented new and useful Improvements in Track-Links, of which the following is a specification.

This invention relates to a track link for self-laying track vehicles.

The principal object of this invention is to provide a track link which is decidedly simple in its construction, will require a minimum of machine operation to prepare it for assembly, and, when assembled, will be self-lubricating.

The invention is illustrated by way of example in the accompanying drawings, in which—

Figure 1:
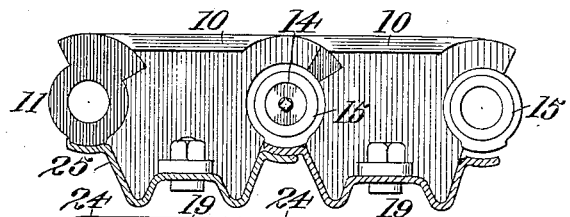
Figure 1 is a view in section, as seen on the line 1—1 of Fig. 3, illustrating assembled links of a track chain.
Figure 2:
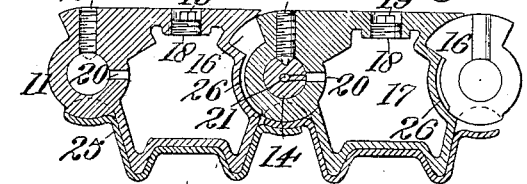
Fig. 2 is a view in section, as seen on the line 2—2 of Fig. 3, illustrating the oil reservoirs and the hinge connections of the links.
Figure 3:
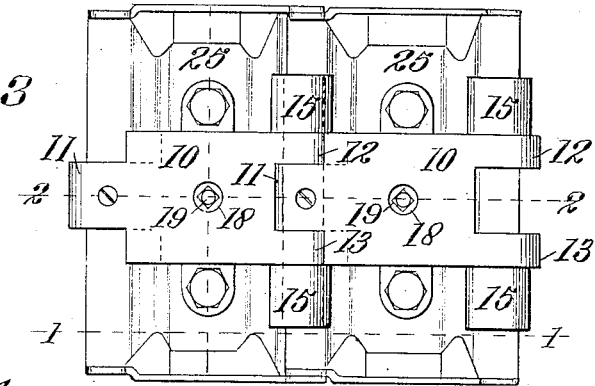
Fig. 3 is a view in plan, illustrating the chain formation of the links.
Figure 4:
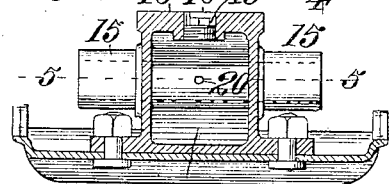
Fig. 4 is a view in transverse section, as seen on the line 4—4 of Fig. 3.
Figure 5:
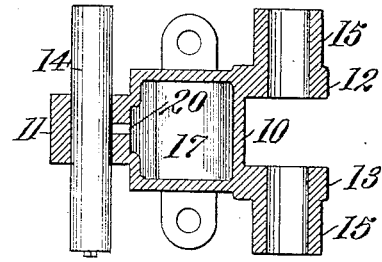
Fig. 5 is a view in horizontal section through one of the links, taken on the line 5—5 of Fig. 4.
Figure 6:
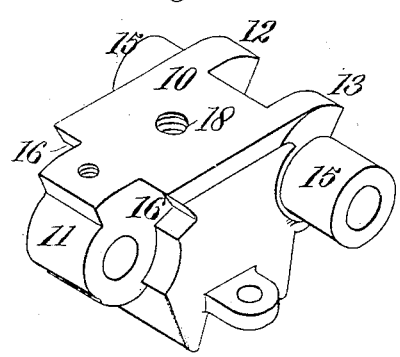
Fig. 6 is a view in perspective, illustrating the link block with its grouser plate removed.
Figure 7:
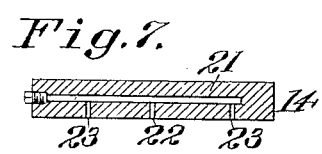
Fig. 7 is a view in longitudinal section, disclosing the oil grooves formed within the link pins.

In the drawings, 10 indicates a rectangular link block. This block forms the rail over which the rollers of a tractor truck pass. At one end of the block a central apertured bearing 11 is formed. At the opposite end a pair of spaced bearing lugs 12 and 13 are formed. The space between these last named lugs is provided to receive the central bearing 11 of a complementary link, thus forming a continuous articulated track. When the links are assembled, the central bearings 11 and the opposite bearings 12 and 13 will be in longitudinal alinement and the bore through them will be suitable to receive a hinge pin 14. These pins extend through the three bearings and also through tubular extensions 15 formed upon the opposite sides of the bearings 12 and 13. These extensions are cylindrical in contour and are provided as roller pins for the sprocket teeth of the truck driving sprockets.

The bearings 11, 12 and 13 are not entirely cylindrical in section, but are formed with segmental lugs upon them. These lugs are complementary upon the adjacent ends of the links and act in combination with shoulders of recesses 16 to limit the swinging movement of the links. The lugs also act to continuously seal the joint between the link blocks and thus exclude foreign material therefrom.

The main body of each link is hollow and thus forms an oil reservoir 17 adapted to be filled through an opening 18 in the upper face of the link. This opening may be closed in any manner and is here shown as fitted with a screw plug 19. An oil duct 20 extends through the vertical side wall of the reservoir and communicates with the bore of the bearings. In order to properly distribute the lubricating fluid to the side bearings 12 and 13, the pin 14 is formed with a longitudinal duct 21, a central inflow duct 22 and outflow ducts 23. The inflow duct 22 is in continuous register with the duct 20 as the pin is held by a set-screw 24. The end ducts provide an outlet for the fluid passing through the longitudinal passageway 21 and thus distribute it to the relatively moving surfaces of the bearings 12, their tubular extensions 15, and the inclosed portions of the pins.

Detachably secured to the under face of each block is a grouser plate 25. This plate may be of any sectional configuration and is here shown as formed with overlapping ends concentric with the pivot pins. Thus the segmental lugs upon the bearings will close the upper portion of the joint between the two links and the ends of the grouser plates will close the lower portion. In order that the links do not bind, the bearings are slightly relieved, as indicated at 26, thus insuring that the lubricated joints will freely operate without binding and without becoming clogged with dirt.

Thus it will be seen that the link structure here shown, while simple in its construction, may be easily machined and assembled and will provide a desirable rolling engagement with the teeth of a sprocket as well as offer adequate lubrication for the separate links.

Having thus described my invention, what I claim and desire to secure by Letters Patent is—

1. A chain track link comprising a body portion forming a central oil reservoir, a pair of spaced pin bearings at one end of said body and extending outwardly to form sprocket-engaging cylinders, a central pin bearing at the opposite end of said body, a pin fixed through said central bearing to extend into complementary end bearings, and means for distributing a lubricant from the reservoir through the pin to the end bearings.

2. A chain track link comprising a body portion forming a central oil reservoir, a pair of spaced pin bearings at one end of said body and extending outwardly to form sprocket-engaging cylinders, a central pin bearing at the opposite end of said body, a pin fixed through said central bearing to extend into complementary end bearings, means for distributing a lubricant from the reservoir through the pin to the end bearings, and overlapping removable grouser plates secured to the under face of said links.

3. In a chain track, a series of connected links, each comprising a body portion within which is formed an oil reservoir, a pair of spaced pin bearings at one end of said body portion, a central pin bearing at the opposite end of said body portion and communicating with the oil reservoir and a pin passing through said bearings for connecting adjacent links together, said pin being provided with a bore and a plurality of ducts whereby oil is carried to the outer bearings.

In testimony whereof I have hereunto set my hand in the presence of two subscribing witnesses.

ELMER E. WICKERSHAM.

Witnesses:
JOHN H. HERRING,
W. W. HEALEY.